United States Patent
Muromachi et al.

(10) Patent No.: US 8,445,096 B2
(45) Date of Patent: *May 21, 2013

(54) VEHICLE WINDOW GLASS AND MANUFACTURING METHOD THEREFOR

(75) Inventors: Takashi Muromachi, Tokyo (JP); Hisashi Ogawa, Tokyo (JP); Mamoru Yoshida, Tokyo (JP); Nobuki Iwai, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 756 days.

This patent is subject to a terminal disclaimer.

(21) Appl. No.: 12/087,758

(22) PCT Filed: Jan. 11, 2007

(86) PCT No.: PCT/JP2007/050624
§ 371 (c)(1),
(2), (4) Date: Jul. 14, 2008

(87) PCT Pub. No.: WO2007/083676
PCT Pub. Date: Jul. 26, 2007

(65) Prior Publication Data
US 2009/0080066 A1    Mar. 26, 2009

(30) Foreign Application Priority Data

Jan. 17, 2006  (JP) ................................ 2006-008491

(51) Int. Cl.
*B32B 3/00* (2006.01)
*B32B 23/02* (2006.01)
*B32B 17/06* (2006.01)

(52) U.S. Cl.
USPC ............ 428/156; 428/172; 428/192; 428/426

(58) Field of Classification Search
USPC ................. 428/156, 172, 192, 141, 143, 144, 428/145, 148, 149, 426, 428, 432, 328, 329, 428/330, 689, 702, 697, 701
See application file for complete search history.

(56) References Cited

U.S. PATENT DOCUMENTS 6,416,890 B1   7/2002  Terneu et al.
6,636,370 B2 * 10/2003  Freeman ....................... 359/894
(Continued)

FOREIGN PATENT DOCUMENTS

EP   1 477 465 A1   11/2004
EP   1 541 536 A1    6/2005
(Continued)

OTHER PUBLICATIONS

European Search Report dated Nov. 26, 2009 issued in counterpart European Application No. 07706931.8.

(Continued)

*Primary Examiner* — Catherine A Simone
(74) *Attorney, Agent, or Firm* — Holtz, Holtz, Goodman & Chick, P.C.

(57) ABSTRACT

A glass substrate is held by a glass substrate holding member in the vertical direction, and a nozzle is used to eject an infrared cutoff liquid onto the upper portion of the glass substrate. The infrared cutoff liquid flows vertically downward so as to be applied onto the glass substrate. The film thickness of the lower portion of an infrared cutoff film is greater than that of the upper portion. The glass substrate is dried for approximately five minutes at room temperature. Then, the glass substrate onto which the infrared cutoff liquid has been applied is placed in an oven preheated to 200° C., heated for ten minutes, and then cooled. The glass substrate having the infrared cutoff film thereon is installed in a railroad vehicle such that the lower portion of the glass substrate is located on the lower side with respect to the railroad vehicle.

9 Claims, 7 Drawing Sheets

U.S. PATENT DOCUMENTS

| | | |
|---|---|---|
| 6,673,456 B1 | 1/2004 | Kobata et al. |
| 2004/0071957 A1 | 4/2004 | Fujita |
| 2005/0003210 A1 | 1/2005 | Inoguchi et al. |
| 2005/0164014 A1 | 7/2005 | Tomonaga et al. |
| 2006/0210776 A1* | 9/2006 | Lu et al. ............ 428/192 |
| 2007/0036985 A1 | 2/2007 | Kamitani et al. |
| 2007/0224340 A1* | 9/2007 | Hatta et al. ............ 427/160 |
| 2009/0007490 A1 | 1/2009 | Muromachi et al. |

FOREIGN PATENT DOCUMENTS

| | | |
|---|---|---|
| EP | 1 736 453 A1 | 12/2006 |
| EP | 1 967 500 A1 | 9/2008 |
| EP | 1 975 133 A1 | 10/2008 |
| JP | 03-080132 A | 4/1991 |
| JP | 06-115348 A | 4/1994 |
| JP | 07-070481 A | 3/1995 |
| JP | 7-157749 A | 6/1995 |
| JP | 07-157749 A | 6/1995 |
| JP | 08-179101 A | 7/1996 |
| JP | 09-030836 A | 2/1997 |
| JP | 10-087349 A | 4/1998 |
| JP | 11-335141 A | 12/1999 |
| JP | 2001-354447 A | 12/2001 |
| JP | 2004-162020 A | 6/2004 |
| JP | 2004-338985 A | 12/2004 |
| JP | 2005-022941 A | 1/2005 |
| RU | 94045904 A1 | 5/1996 |
| RU | 94033485 A1 | 7/1996 |
| RU | 32039 U1 | 9/2003 |
| RU | 2 233 812 C2 | 8/2004 |
| WO | WO 2004/011381 A1 | 2/2004 |
| WO | WO 2005/095298 A1 | 10/2005 |
| WO | WO 2005118503 A1 * | 12/2005 |

OTHER PUBLICATIONS

U.S. Appl. No. 12/087,139, filed Jun. 26, 2008, entitled: "Vehicle Window Pane and Manufacturing Method Therefor," Inventor: T. Muromachi et al.

International Preliminary Report on Patentability, Chapter I of the Patent Cooperation Treaty, and Written Opinion for PCT/JP2007/050624 dated Jul. 31, 2008. 6 sheets.

Russian Office Action (Decision on Grant) dated Jan. 28, 2011 (and English translation thereof) in counterpart Russian Application No. 2008133625/03(042330).

* cited by examiner

VEHICLE WINDOW GLASS AND MANUFACTURING METHOD THEREFOR

This application is a U.S. National Phase Application under 35 USC 371 of International Application PCT/JP2007/050624 filed Jan. 11, 2007.

TECHNICAL FIELD

The present invention relates to a vehicle window glass and a manufacturing method therefor, and more particularly, to a vehicle window glass and a manufacturing method therefor, for example, having a capability of cutting off (shielding) infrared rays.

BACKGROUND ART

In recent years, there has been known a technology for including an expensive, rare metal, such as indium, in a thin film formed on the surface of a glass substrate to provide, for example, a capability of cutting off (shielding) infrared rays (see a pamphlet of WO International publication No. 2004/011381 and a pamphlet of WO International publication No. 2005/095298, for example).

In the infrared shielding glass described in the pamphlet of WO International publication No. 2004/011381, use of ITO powder containing fluorine component having excellent heat resistance allows a sol-gel method to be performed even at high temperatures of 350° C. or higher. The fluorine component is introduced into an infrared cutoff film to insulate the ITO fine particles from heat.

In the infrared shielding glass described in the pamphlet of WO publication No. 2005/095298, an infrared cutoff film is formed on at least one of the surfaces of a glass substrate. The infrared cutoff film has an organic-inorganic composite film obtained by compositing an organic substance and an inorganic oxide and ITO fine particles as an infrared cutoff component contained in the composite film.

However, when any of the infrared shielding glass described in the pamphlets of WO International publication No. 2004/011381 and WO International publication No. 2005/095298 is applied to, for example, a window glass for a railroad vehicle, it is a principal object to efficiently cut off infrared rays impinging on passengers sitting on window seats most susceptible to sunlight exposure.

Increasing the film thickness of the whole infrared cutoff film to enhance the infrared cutoff effect disadvantageously increases the cost of manufacturing the infrared shielding glass.

An object of the present invention is to provide a vehicle window glass that can be manufactured at low cost and can efficiently cut off infrared rays impinging on passengers sitting on window seats most susceptible to sunlight exposure, and a manufacturing method for the same.

DISCLOSURE OF THE INVENTION

To attain the above object, according to a first aspect of the present invention, there is provided a vehicle window glass comprising an infrared cutoff film formed thereon, wherein the film thickness of a vehicle lower side portion of the infrared cutoff film is greater than the film thickness of a vehicle upper side portion of the same.

In the first aspect of the present invention, the infrared cutoff film preferably contains a silica component and an infrared cutoff component.

In the first aspect of the present invention, the infrared cutoff component is preferably comprised of at least one of fine particles selected from the group consisting of tin-doped indium oxide (ITO) fine particles, antimony-doped tin oxide (ATO) fine particles, aluminum-doped zinc oxide (AZO) fine particles, indium-doped zinc oxide (IZO) fine particles, tin-doped zinc oxide fine particles, silicon-doped zinc oxide fine particles, lanthanum hexaboride fine particles, and cerium hexaboride fine particles.

In the first aspect of the present invention, the content of the infrared cutoff component is preferably 20 to 45 mass % of the total mass of the infrared cutoff film.

In the first aspect of the present invention, the film thickness of the infrared cutoff film preferably continuously varies from the vehicle upper side portion thereof to the vehicle lower side portion thereof.

In the first aspect of the present invention, the difference between the greatest film thickness of the vehicle lower side portion of the infrared cutoff film and the smallest film thickness of the vehicle upper side portion of the same is preferably 1000 nm or greater.

In the first aspect of the present invention, the greatest film thickness of the vehicle lower side portion of the infrared cutoff film is preferably not smaller than twice the smallest film thickness of the vehicle upper side portion of the same.

In the first aspect of the present invention, a thinnest part of the vehicle upper side portion of the infrared cutoff film preferably has an optical transmittance of 30% or lower within the wavelength range from 1000 to 1600 nm and an optical transmittance of 20% or lower within the wavelength range from 1600 to 2500 nm, and a thickest part of the vehicle lower side portion of the infrared cutoff film preferably has an optical transmittance of 20% or lower within the wavelength range from 1000 to 1600 nm and an optical transmittance of 10% or lower within the wavelength range from 1600 to 2500 nm.

In the first aspect of the present invention, the 1550 nm wavelength optical transmittance of a thinnest part of the vehicle lower side portion of the infrared cutoff film where the film is preferably not higher than 50% of the 1550 nm wavelength optical transmittance of a thickest part of the vehicle upper side portion of the infrared cutoff film.

To attain the above object, according to a second aspect of the present invention, there is provided a manufacturing method for a vehicle window glass on which an infrared cutoff film is formed, the method comprising the forming step of forming the infrared cutoff film by applying an infrared cutoff liquid onto the surface of a glass substrate by using flow coating in such a way that the film thickness of a vehicle lower side portion of the infrared cutoff is greater than the film thickness of a vehicle upper side portion of the same.

BEST MODE FOR CARRYING OUT THE INVENTION

The present inventor has intensively conducted studies to attain the above object and found that in a vehicle window glass on which an infrared cutoff film is formed, making the film thickness of a vehicle lower side portion of the infrared cutoff film greater than the film thickness of a vehicle upper side portion of the same can enhance the infrared cutoff effect of the vehicle lower side portion through which direct infrared rays likely impinge on passengers, so that manufacturing cost can be reduced and infrared rays impinging on the passengers sitting on window seats most susceptible to sunlight exposure can be efficiently cut off.

The present invention has been made based on the result of the studies described above.

Embodiments of the present invention will be described below in detail with reference to the drawings.

Figure 1:
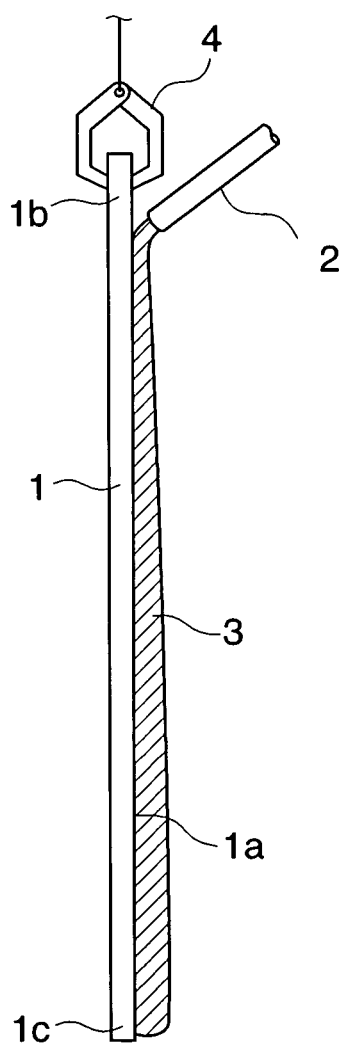
FIG. 1 is a view useful for explaining a manufacturing method for a vehicle window glass according to an embodiment of the present invention.

FIG. 1 is a view useful for explaining a manufacturing method for a vehicle window glass according to an embodiment of the present invention.

In FIG. 1, a coating apparatus includes a glass substrate holding member 4 that holds a glass substrate 1 and a nozzle 2 that ejects an infrared cutoff liquid 3 onto a coating surface 1a of the glass substrate 1.

The infrared cutoff liquid 3 contains major components consisting of a silica component and the like, the constituent unit of which is silica ($SiO_2$), an organic substance, tin-doped indium oxide (ITO) fine particles (Indium (In)-Tin (Sn) Oxide) as an infrared cutoff component, an inorganic substance, and alcohol, such as ethanol, as a solvent.

The infrared cutoff component is not limited to tin-doped indium oxide (ITO) fine particles, but may be any one of antimony-doped tin oxide (ATO) fine particles, aluminum-doped zinc oxide (AZO) fine particles, indium-doped zinc oxide (IZO) fine particles, tin-doped zinc oxide fine particles, silicon-doped zinc oxide fine particles, lanthanum hexaboride fine particles, and cerium hexaboride fine particles, or any combination thereof.

The content of the infrared cutoff component in the infrared cutoff film is 20 to 45% of the total mass of the infrared cutoff film.

The silica component and the organic substance form a matrix in the infrared cutoff film formed on the coating surface 1a.

A sol-gel method is used to form a film containing the ITO fine particles dispersed in the matrix containing the silica component and the organic substance. The ITO fine particles are immobilized in a state where the ITO fine particles are dispersed in the matrix by using the sol-gel method to solidify the matrix in the sol state. The content of the ITO fine particles immobilized in the matrix is 20 to 45 mass % of the total mass of the infrared cutoff film. When the content of the ITO fine particles is lower than 20 mass % of the total mass of the infrared cutoff film, the infrared shielding capability of cutting off infrared rays decreases, whereas when the content of the ITO fine particles is higher than 45 mass % of the total mass of the infrared cutoff film, the hardness of the infrared cutoff film decreases.

The particle diameter of the ITO fine particle is smaller than or equal to 100 nm, preferably smaller than or equal to 40 nm, more preferably 1 to 40 nm. By setting the particle size within the above range, the efficiency of cutting off infrared rays can be high and generation of haze resulting from a large particle size of the fine particles can be suppressed.

As the organic substance in the infrared cutoff film, hydrophilic organic polymer, for example, such as either polyalkylene oxide or thermal decomposition product of the polyalkylene oxide is used. Such the organic substance is composited with an inorganic oxide containing a silica component, such as silicon alkoxide, thereby forming a matrix. That is, the matrix has an organic-inorganic composite film made of an organic-inorganic composite compound in which the organic substance and the inorganic oxide are coupled or combined at the molecular level.

The content of the organic substance is 2 to 60% of the total mass of the infrared cutoff film. When the content of the organic substance is lower than 2 mass % of the total mass of the infrared cutoff film, the shrinkage relaxation effect is not exhibited in a sufficient manner and hence the possibility of cracking increases when a thick film is formed. On the other hand, when the content of the organic substance is higher than 60 mass % of the total mass of the infrared cutoff film, the content of the organic substance in the infrared cutoff film is too high to exhibit sufficient hardness.

The content of the silica component in the infrared cutoff film is 20 to 78% of the total mass of the infrared cutoff film, preferably 40 to 78%. When the content of the silica component is lower than 20 mass % of the total mass of the infrared cutoff film, the haze value of the infrared cutoff glass, which is measured after an abrasion resistance test (Taber abrasion test) is performed on the surface on which the infrared cutoff film is formed, cannot be lowered. The concentration of the silica component in the starting material of the matrix added to a solution used in the sol-gel method is 20 to 40 mass %.

The concentration (mass %) of the silica component is determined by calculating the content of the silica, which is the constituent unit of the silica component. For example, even when the organic substance and the silica (silicon oxide) form amorphous material as a composite compound, the mass percentage of the silica component is determined by calculating the content of silica.

In the technique of manufacturing the vehicle window glass described above, desired properties of the infrared cutoff glass can be obtained through baking at a temperature lower than not only the temperature at which the heat insulation capability and the infrared shielding capability of the ITO fine particles can be maintained but also the decomposition temperature of the functional materials, for example, 200° C. In this way, it is possible to provide infrared cutoff glass in which thermally unstable ITO fine particles and other functional materials are introduced, with the capabilities thereof intact, into the infrared cutoff film.

With the glass substrate 1 held by the glass substrate holding member 4 in the vertical direction, the nozzle 2 is used to eject the infrared cutoff liquid 3 onto the upper portion 1b of the glass substrate 1. The infrared cutoff liquid 3 ejected onto the upper portion 1b of the glass substrate 1 flows vertically downward such as to be applied onto the glass substrate 1. In this way, the film thickness of the infrared cutoff liquid 3 of the lower portion 1c of the glass substrate 1 is greater than that of the upper portion 1b of the glass substrate 1.

The glass substrate 1 onto which the infrared cutoff liquid 3 has been applied is dried for approximately five minutes at room temperature. Then, the glass substrate 1 onto which the infrared cutoff liquid 3 has been applied is placed in an oven preheated to 200° C., heated for ten minutes, and then cooled so as to manufacture the glass substrate 1 having the infrared cutoff film thereon.

Figure 2:
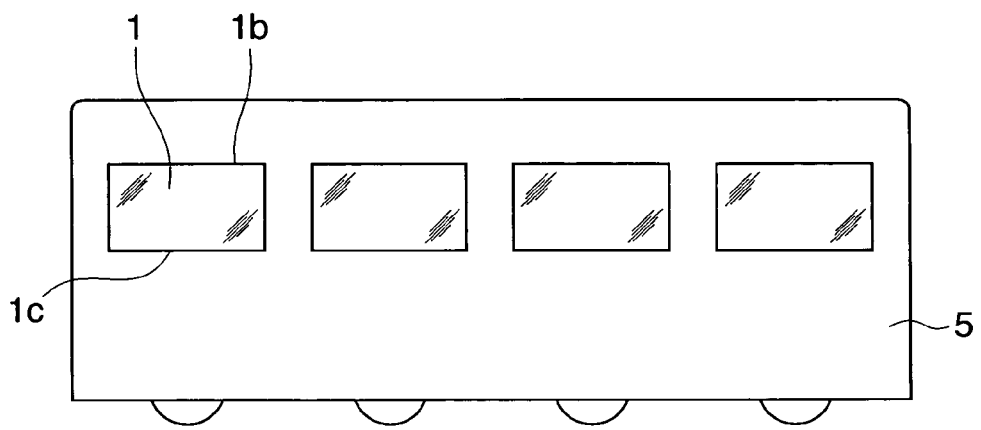
FIG. 2 is a view useful for explaining how to install the glass substrate in FIG. 1 in a railroad vehicle.

FIG. 2 is a view useful for explaining how to install the glass substrate 1 in FIG. 1 in a railroad vehicle 5.

Figure 8:
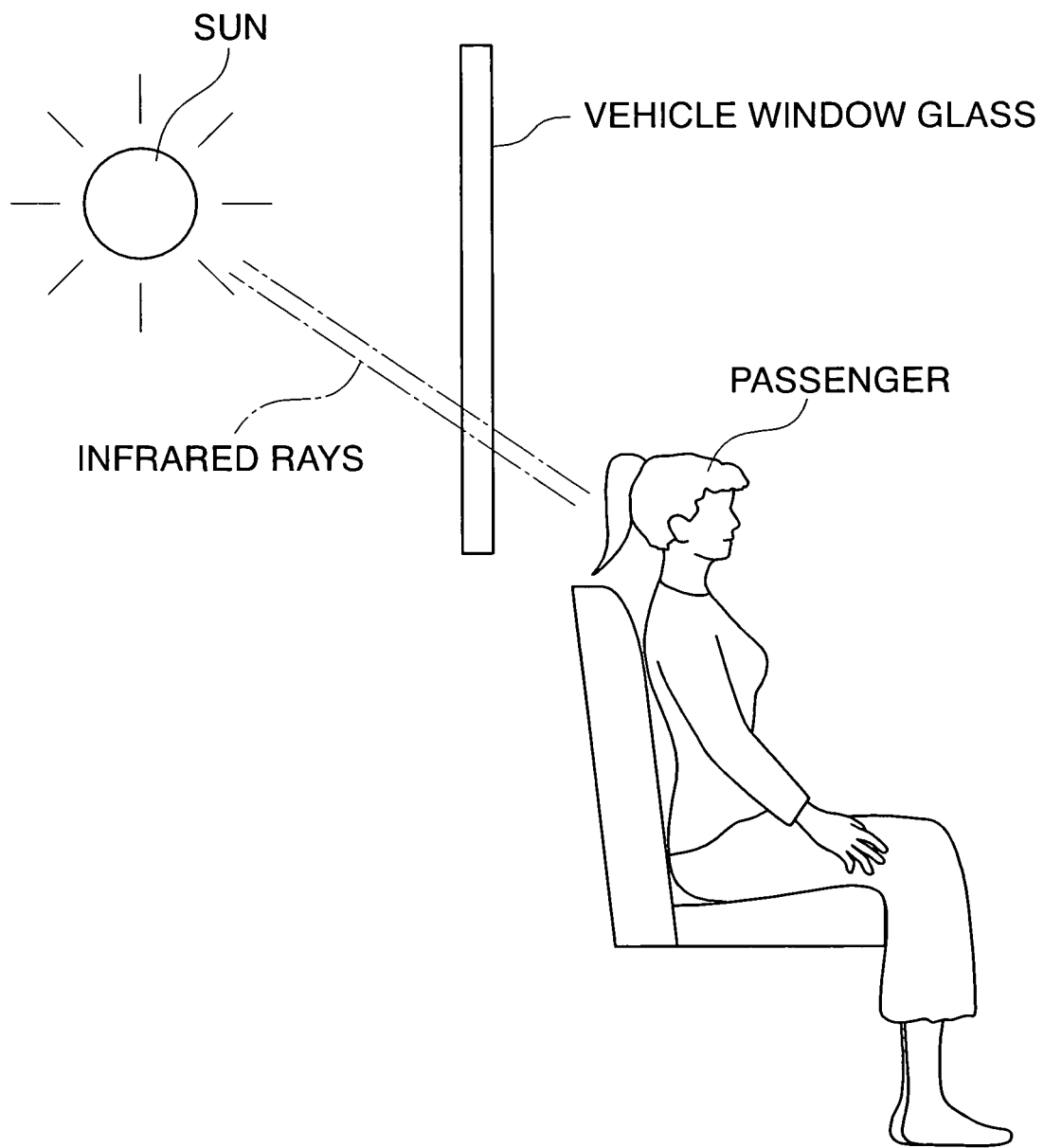
FIG. 8 is a view useful for explaining that sunlight passing through the lower portion of a window glass of a railroad vehicle likely impinges directly on passengers sitting on the seats in the railroad vehicle.

In FIG. 2, sunlight passing through the lower portion of the glass substrate 1 of the railroad vehicle 5 likely impinges directly on passengers sitting on the seats in the railroad vehicle 5 (see FIG. 8).

The glass substrate 1 having the infrared cutoff film thereon obtained by using the manufacturing method described above is installed in the railroad vehicle 5 in such a way that the lower portion 1c of the glass substrate 1 is located on the lower side with respect to the railroad vehicle 5 and the upper portion 1b of the glass substrate 1 is located on the upper side with respect to the railroad vehicle 5. In this way, infrared rays that likely impinge directly on passengers can be efficiently shielded.

Specific examples of the present invention will be described below.

A solution which was prepared by mixing polyethylene glycol (PEG400: KANTO CHEMICAL CO., INC.), pure water, polyether phosphate ester-based surfactant (Solsperse 41000: Lubrizol Japan Ltd.) as a polymeric dispersant, and denatured alcohol (SOLMIX (registered trademark) AP-7: Japan Alcohol Trading CO., LTD. (hereinafter referred to as "AP-7")) in this order was stirred for one minute. Then, AP-7 to which 1 mass % of concentrated hydrochloric acid (KANTO CHEMICAL CO., INC.) was included (hereinafter referred to as "1 mass % AP-7") was added to the above solution, and this mixture was then stirred for one minute.

Then, tetraethoxysilane (KBE-04: SHIN-ETSU CHEMICAL CO., LTD., content of silica component: 28.8 mass %) was added to the above mixture, and this mixture was stirred for four hours at room temperature. Then, ITO dispersed liquid which was made by stirring a mixture of ITO fine particles and ethanol with the mass ratio of ITO particles: ethanol=2:3 for four hours was added to the above mixture, and stirred for 30 minutes so as to obtain an infrared cutoff liquid "a". Fine particles having diameters ranging from approximately 10 to 20 nm were used as the ITO fine particles in the ITO dispersed liquid.

An infrared cutoff liquid "b" was also prepared in a manner similar to the infrared cutoff liquid "a" except that no polyethylene glycol was added. Table 1 shows the amount of each of the liquids used to form the infrared cutoff liquids "a" and "b".

In an example 1 and a comparative example 1, as the glass substrate 1, a 4 mm-thick soda-lime-silica glass substrate (green glass having a UV absorption capability) was cut into a railroad vehicle window glass, polished, reinforced, and cleaned before installation.

Flow coating was used to apply the infrared cutoff liquid "a" onto the surface of the glass substrate 1 in an environment where the relative humidity was 30% RH and the temperature was 20° C.

In this process, in the example 1, the infrared cutoff liquid "a" was applied onto the glass substrate 1 held by the glass substrate holding member 4 in such a way that a portion of the glass substrate 1 which would be located on the upper side with respect to the railroad vehicle 5 when the glass substrate 1 would be installed in the railroad vehicle 5 was up. In the comparative example 1, the infrared cutoff liquid "a" was applied onto the glass substrate 1 held by the glass substrate holding member 4 in such a way that a portion of the glass substrate 1 which would be located on the lower side with respect to the railroad vehicle 5 when the glass substrate 1 would be installed in the railroad vehicle 5 was up.

In an example 2, as the glass substrate 1, a 5 mm-thick privacy glass substrate (LEGART (registered trademark) 50: Nippon Sheet Glass Co., Ltd.) was cut into a railroad vehicle window glass, polished, reinforced, and cleaned before installation.

Flow coating was used to apply the infrared cutoff liquid "b" onto the surface of the glass substrate 1 in an environment where the relative humidity was 30% RH and the temperature was 20° C.

In this process, in the example 2, the infrared cutoff liquid "b" was applied onto the glass substrate 1 held by the glass substrate holding member 4 in such a way that a portion of the glass substrate 1 which would be located on the upper side with respect to the railroad vehicle 5 when the glass substrate 1 would be installed in the railroad vehicle 5 was up.

The glass substrates 1 onto which the infrared cutoff liquids "a" and "b" had been applied were dried for approximately five minutes at room temperature. Then, the glass substrates 1 onto which the infrared cutoff liquids "a" and "b" had been applied were placed in an oven preheated to 200° C., heated for ten minutes, and then cooled so as to manufacture infrared cutoff glass substrate.

For the manufactured infrared cutoff glass, the content of the ITO fine particles in the infrared cutoff film (hereinafter referred to as "ITO content"), the content of the organic substance in the infrared cutoff film (hereinafter referred to as "organic substance content"), and the content of the silica component in the infrared cutoff film (hereinafter referred to as "silica content") were calculated based on the mass of each of the material components added to the infrared cutoff liquids "a" and "b". Table 2 shows the calculation results. The calculation was based on the mass of the ITO fine particles being 40 mass % of the ITO dispersed liquid, the mass of the organic substance being the total mass of the polymeric dispersant and the polyethylene glycol, and the mass of the silica

TABLE 1

|  | Polyethylene glycol | Water | Polymeric dispersant | Denatured alcohol | 1 mass % AP-7 | Tetraethoxy silane | (Unit: g) ITO dispersed liquid |
|---|---|---|---|---|---|---|---|
| Infrared cutoff liquid "a" | 0.036 | 5.86 | 0.162 | 12.44 | 3.00 | 6.25 | 2.25 |
| Infrared cutoff liquid "b" | 0 | 5.78 | 0.450 | 13.70 | 3.00 | 6.25 | 2.25 | component being on the content of the silica component in the tetraethoxysilane, which was 28.8 mass %.

TABLE 2

|  | ITO content (mass %) | Organic substance content (mass %) | Silica content (mass %) |
|---|---|---|---|
| Infrared cutoff liquid "a" | 31 | 7 | 62 |
| Infrared cutoff liquid "b" | 29 | 14 | 57 |

(unit: mass %)

Figure 3:
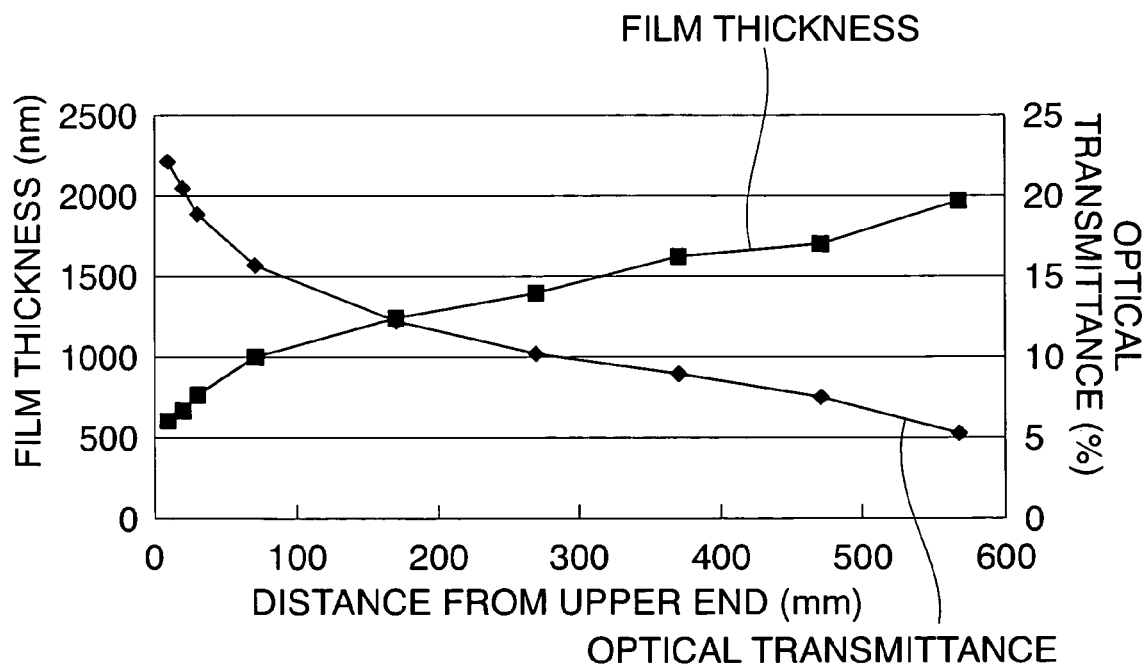
FIG. 3 is a view showing the film thickness of an infrared cutoff film formed on the surface of the glass substrate in FIG. 1 and the 1550 nm wavelength optical transmittance of the glass substrate on which the infrared cutoff film is formed.

The glass substrate 1 according to the example 1 was broken into pieces, and a cross-section of the infrared cutoff film formed on the surface of one of the pieces was observed with a field emission scanning electron microscope (SEM) (Model S-4700: HITACHI, LTD.). The observation result was used to determine the film thickness of the infrared cutoff films. Before the measurement, a Pt—Pd film was coated on the each specimen (piece) to be measured to make it conductive. The acceleration voltage was set to 5 kV as the measurement condition. The 1550 nm wavelength optical transmittance of the glass substrate 1 on which the infrared cutoff film was formed was measured with a spectrophotometer (Model: UV-3100PC: SHIMADZU CORPORATION). FIG. 3 shows the measurement results.

In FIG. 3, the vertical axis on the left represents the film thickness (nm) of the infrared cutoff film formed on the surface of the glass substrate 1, and the vertical axis on the right represents the 1550 nm wavelength optical transmittance of the glass substrate 1 on which the infrared cutoff film is formed.

The horizontal axis represents the distance (mm) from the upper end of the glass substrate 1 on which the infrared cutoff film is formed according to the example 1. The left side of the figure (distance: 0 mm) represents the upper portion 1b of the glass substrate 1, and the right side (distance: 600 mm) represents the lower portion 1c of the glass substrate 1.

The film thickness of the infrared cutoff film continuously varies from the upper side with respect to the railroad vehicle 5 thereof to the lower side with respect to the railroad vehicle 5 thereof. The difference between the smallest film thickness of the infrared cutoff film on the upper portion 1b of the glass substrate 1 and the greatest film thickness of that on the lower portion 1c of the glass plate 1 is approximately 1400 nm or greater. The greatest film thickness of the infrared cutoff film on the lower portion 1c of the glass substrate 1 is not smaller than three times the smallest film thickness of the same on the upper portion 1b of the glass substrate 1.

The 1550 nm wavelength optical transmittance of a thickest part of the lower portion 1c of the glass substrate 1 is not higher than 50% of the 1550 nm wavelength optical transmittance of a thinnest part of the upper portion 1b of the glass substrate 1.

Figure 4:
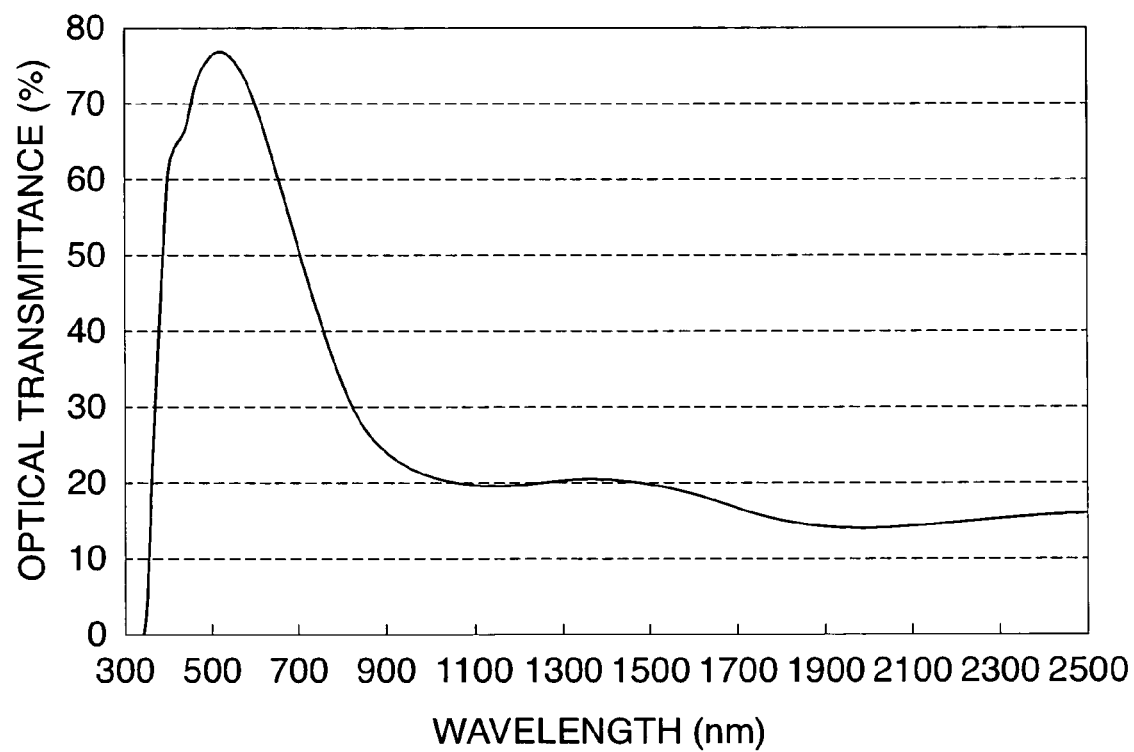
FIG. 4 is a view showing the optical transmittance within the wavelength range from 300 nm to 2500 nm at the upper portion of the glass substrate according to an example 1.
Figure 5:
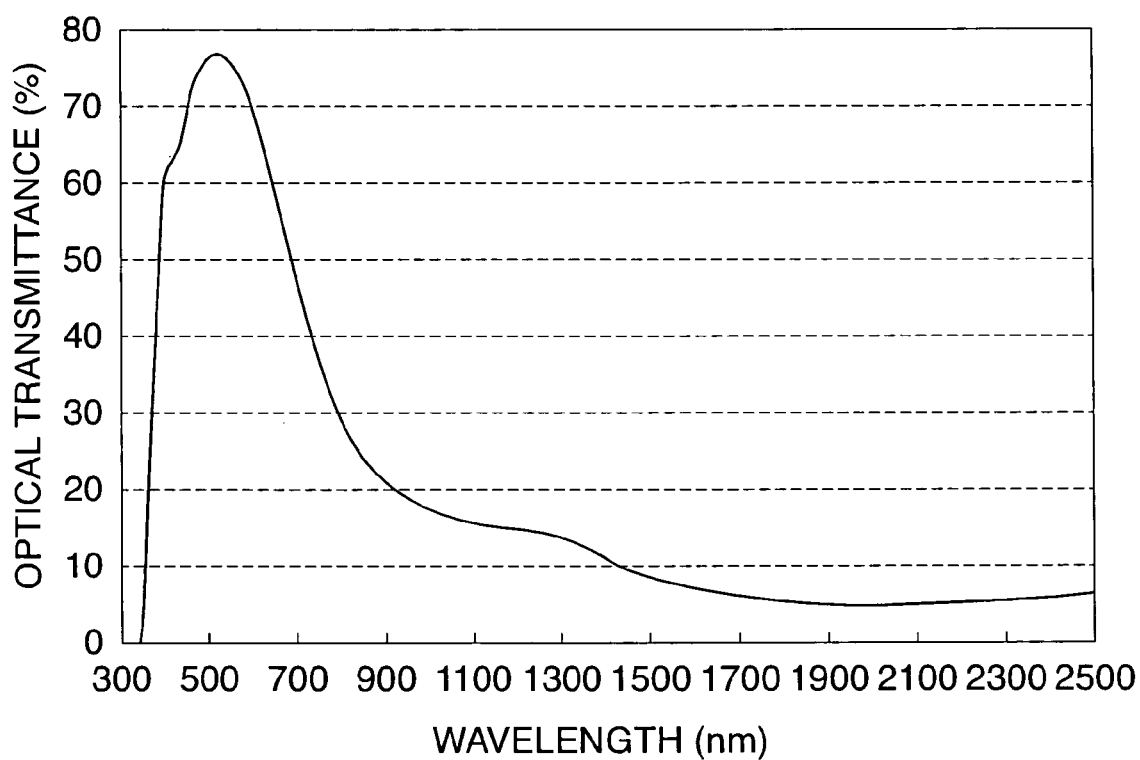
FIG. 5 is a view showing the optical transmittance within the wavelength range from 300 nm to 2500 nm at the lower portion of the glass substrate according to the example 1.

The optical transmittance within the wavelength range from 300 to 2500 nm of the upper and lower portions 1b and 1c of the glass substrate 1 on which the infrared cutoff film is formed according to the example 1 were measured with the spectrophotometer (Model: UV-3100PC: SHIMADZU CORPORATION). FIGS. 4 and 5 show the measurement results.

FIG. 4 is a view showing the optical transmittance within the wavelength range from 300 to 2500 nm of the upper portion 1b of the glass substrate 1 according to the example 1. FIG. 5 is a view showing the optical transmittance within the wavelength range from 300 to 2500 nm of the lower portion 1c of the glass substrate 1 according to the example 1.

In FIGS. 4 and 5, the thinnest part of the upper portion 1b of the glass substrate 1 has an optical transmittance of 30% or lower within the wavelength range from 1000 to 1600 nm and an optical transmittance of 20% or lower within the wavelength range from 1600 to 2500 nm, and the thickest part of the lower portion 1c of the glass substrate 1 has an optical transmittance of 20% or lower within the wavelength range from 1000 to 1600 nm and an optical transmittance of 10% or lower within the wavelength range from 1600 to 2500 nm.

Figure 6:
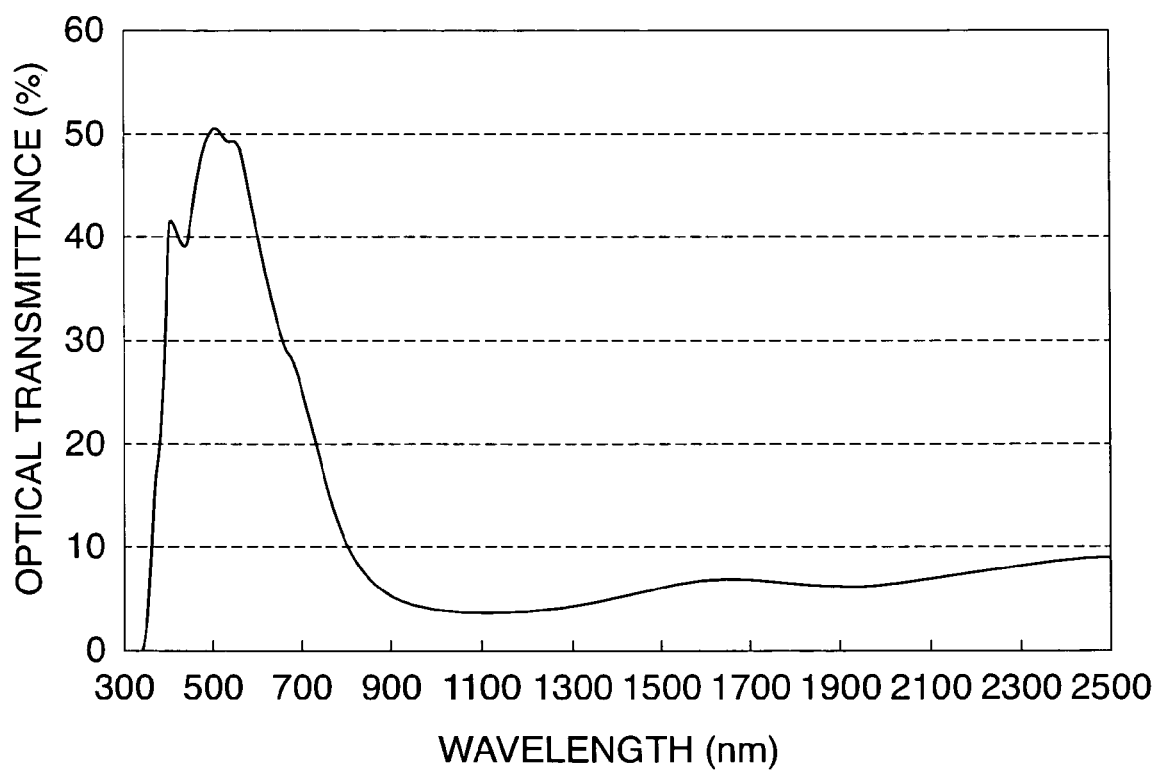
FIG. 6 is a view showing the optical transmittance within the wavelength range from 300 nm to 2500 nm at the upper portion of the glass substrate according to an example 2.
Figure 7:
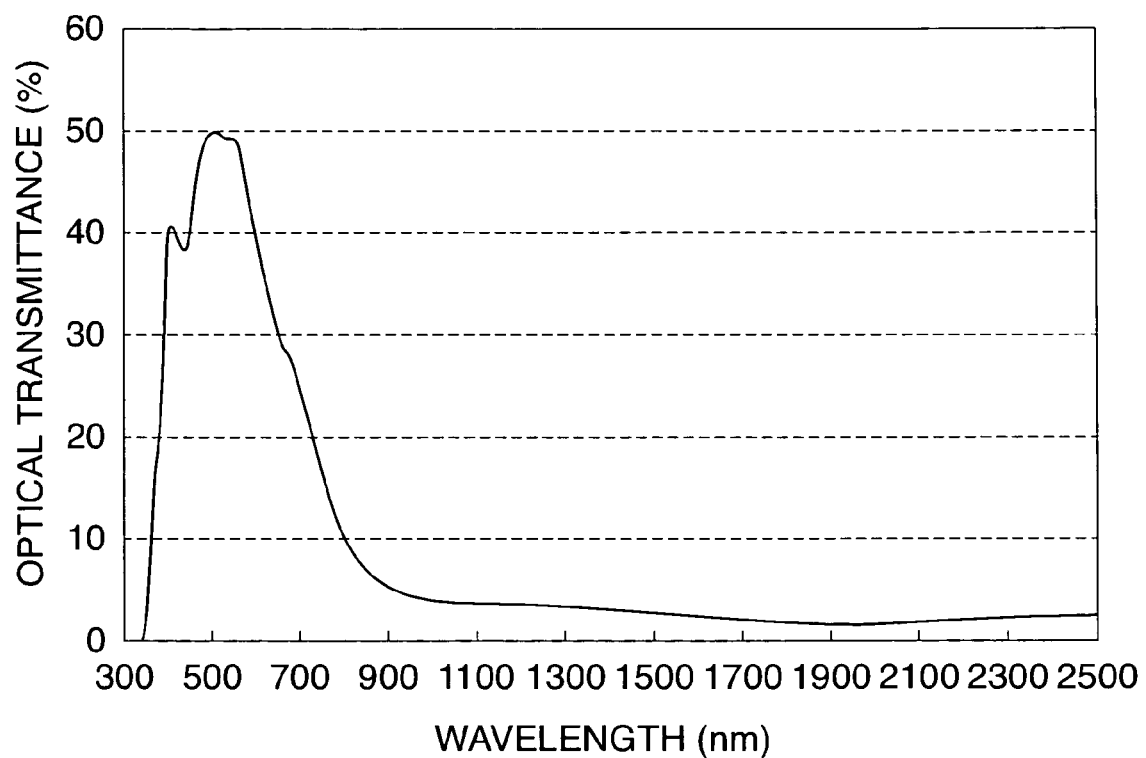
FIG. 7 is a view showing the optical transmittance within the wavelength range from 300 nm to 2500 nm at the lower portion of the glass substrate according to the example 2.

The optical transmittance within the wavelength range from 300 to 2500 nm of the upper and lower portions 1b and 1c of the glass substrate 1 on which the infrared cutoff film is formed according to the example 2 were measured with the spectrophotometer (Model: UV-3100PC: SHIMADZU CORPORATION). FIGS. 6 and 7 show the measurement results.

FIG. 6 is a view showing the optical transmittance within the wavelength range from 300 to 2500 nm of the upper portion 1b of the glass substrate 1 according to the example 2. FIG. 7 is a view showing the optical transmittance within the wavelength range from 300 to 2500 nm of the lower portion 1c of the glass substrate 1 according to the example 2.

In FIGS. 6 and 7, the upper portion 1b of the glass substrate 1 where the film thickness is the smallest has an optical transmittance of 10% or lower within the wavelength range from 1000 to 2500 nm, and the lower portion 1c of the glass substrate 1 where the film thickness is the greatest has an optical transmittance of 5% or lower within the wavelength range from 1000 to 2500 nm.

The glass substrates 1 according to the examples 1 and 2 and the comparative example 1 were installed in the window portions of the railroad vehicle 5. The railroad vehicle 5 was disposed in such a way that sunlight impinges straight on the window portion of the railroad vehicle 5 in which the glass substrates 1 according to the examples 1 and 2 and the comparative example 1 were installed. Passengers were seated on the seats close to the window portion of the railroad vehicle 5 in which the glass substrates 1 according to the examples 1 and 2 and the comparative example 1 were installed. The angle between the sunlight that entered the vehicle and the horizontal plane was set to 60 degrees, and burning sensations of the skin of the passengers due to infrared rays when the sunlight impinged on the passengers for five minutes were compared among the examples 1 and 2 and the comparative example 1. Table 3 shows the comparison results.

TABLE 3

|  | Infrared cutoff liquid | Glass substrate | Method for applying infrared cutoff liquid | Burning sensation |
|---|---|---|---|---|
| Example 1 | Infrared cutoff liquid "a" | Soda-lime-silica glass substrate | A portion of the glass substrate which would be located on the upper side with respect to railroad vehicle was up | No |
| Example 2 | Infrared cutoff liquid "b" | Privacy glass substrate | A portion of the glass substrate which would be located on the upper side with respect to railroad vehicle was up | No |

TABLE 3-continued

| | Infrared cutoff liquid | Glass substrate | Method for applying infrared cutoff liquid | Burning sensation |
|---|---|---|---|---|
| Comparative example 1 | Infrared cutoff liquid "a" | Soda-lime-silica glass substrate | A portion of the glass substrate which would be located on the lower side with respect to railroad vehicle was up | Slightly yes |

Since most of the sunlight impinging on the passengers sitting on the seats in the railroad vehicle was the light passing through the lower portion of the glass substrate 1 of the railroad vehicle 5, the burning sensation of the skin of the passengers due to infrared rays passing through the glass substrates 1 according to the examples 1 and 2, both having higher infrared cutoff effects of the lower portion of the glass substrate 1 of the railroad vehicle 5, was reduced as compared to the glass substrate 1 according to the comparative example 1.

According to the above embodiments, since the film thickness of the lower portion of the infrared cutoff film located on the lower side with respect to the railroad vehicle 5 is greater than the film thickness of the upper portion of the infrared cutoff film located on the upper side with respect to the railroad vehicle 5, the infrared light cutoff effect of the lower portion located on the lower side with respect to the railroad vehicle 5 where direct infrared rays likely impinge on passengers can be enhanced. Hence, the manufacturing cost can be reduced and the infrared rays impinging on passengers sitting on window seats most susceptible to sunlight exposure can be efficiently cut off.

In the above embodiments, the glass substrate 1 is applied to a window glass for the railroad vehicle 5, but not limited thereto. For example, the glass substrate 1 may be applied to a window glass for an automobile and the like.

INDUSTRIAL APPLICABILITY

According to the vehicle window glass of the present invention, since the film thickness of a vehicle lower side portion of the infrared cutoff film is greater than the film thickness of a vehicle upper side portion of the same, the infrared light cutoff effect of the vehicle lower side portion through which direct infrared rays likely impinge on passengers can be enhanced. Hence, the manufacturing cost can be reduced and the infrared rays impinging on passengers sitting on window seats most susceptible to sunlight exposure can be efficiently cut off at the same time.

According to the vehicle window glass of the present invention, since the infrared cutoff film contains a silica component and an infrared cutoff component, the durability of the infrared cutoff film can be enhanced.

According to the vehicle window glass of the present invention, since the infrared cutoff component is comprised of at least one of fine particles selected from the group consisting of tin-doped indium oxide (ITO) fine particles, antimony-doped tin oxide (ATO) fine particles, aluminum-doped zinc oxide (AZO) fine particles, indium-doped zinc oxide (IZO) fine particles, tin-doped zinc oxide fine particles, silicon-doped zinc oxide fine particles, lanthanum hexaboride fine particles, and cerium hexaboride fine particles, the infrared shielding capability can be reliably provided.

According to the vehicle window glass of the present invention, since the content of the infrared cutoff component is 20 to 45 mass % of the total mass of the infrared cutoff film, the infrared shielding capability can be reliably provided and the durability of the infrared cutoff film can be enhanced.

According to the vehicle window glass of the present invention, the film thickness continuously varies from vehicle upper side portion thereof to the vehicle lower side portion thereof, there is no step on the infrared cutoff film and hence the abrasion resistance can be enhanced.

According to the manufacturing method for a vehicle window glass of the present invention, since flow coating is used to form an infrared cutoff film on the surface of a glass substrate and the glass substrate on which the infrared cutoff film has been formed is installed in the vehicle in such a way that the film thickness of a vehicle lower side portion of the infrared cutoff film is greater than the film thickness of a vehicle upper side portion of the same, the manufacturing cost can be reduced and the infrared rays impinging on passengers sitting on window seats most susceptible to sunlight exposure can be efficiently cut off.

The invention claimed is:

1. A vehicle window glass comprising:
a single sheet of glass plate; and
an infrared cutoff film formed on the single sheet of glass plate;
wherein a film thickness of the infrared cutoff film on a lower portion of the vehicle window glass is greater than the film thickness on an upper portion of the vehicle window glass when the vehicle window glass in mounted in a vehicle, and
wherein a variation from a minimum value in the film thickness on the upper portion to a maximum value on the lower portion is at least 1000 nm per 600 mm in a vertical direction of the vehicle window glass when mounted in the vehicle.

2. The vehicle window glass according to claim 1, wherein said infrared cutoff film contains a silica component and an infrared cutoff component.

3. The vehicle window glass according to claim 2, wherein said infrared cutoff component comprises at least one selected from the group consisting of tin-doped indium oxide (ITO) fine particles, antimony-doped tin oxide (ATO) fine particles, aluminum-doped zinc oxide (AZO) fine particles, indium-doped zinc oxide (IZO) fine particles, tin-doped zinc oxide fine particles, silicon-doped zinc oxide fine particles, lanthanum hexaboride fine particles, and cerium hexaboride fine particles.

4. The vehicle window glass according to claim 2, wherein said infrared cutoff component is 20 to 45 mass % of a total mass of said infrared cutoff film.

5. The vehicle window glass according to claim 1, wherein the film thickness of said infrared cutoff film continuously varies from the upper portion to the lower portion.

6. The vehicle window glass according to claim 1, wherein a greatest film thickness of the infrared cutoff film on the lower portion is not smaller than twice a smallest film thickness of the infrared cutoff film of the upper portion.

7. The vehicle window glass according to claim 1, wherein a thinnest part of the infrared cutoff film on the upper portion has an optical transmittance of 30% or lower within the wavelength range from 1000 to 1600 nm and an optical transmittance of 20% or lower within the wavelength range from 1600 to 2500 nm, and a thickest part of the infrared cutoff film on the lower side portion has an optical transmittance of 20% or lower within the wavelength range from 1000 to 1600 nm and an optical transmittance of 10% or lower within the wavelength range from 1600 to 2500 nm.

8. The vehicle window glass according to claim 1, wherein a 1550 nm wavelength optical transmittance of a thickest part of the infrared cutoff film on the lower portion where the film thickness is greatest is not higher than 50% of the 1550 nm wavelength optical transmittance of a thinnest part of the infrared cutoff film on the upper side portion where the film thickness is smallest.

9. A production method for the vehicle window glass according to claim 1, the method comprising:
   forming the infrared cutoff film by applying an infrared cutoff liquid onto a surface of the sheet of glass plate by using flow coating in such a way that the film thickness on the lower portion of the vehicle window glass is greater than the film thickness on the upper portion of the vehicle window glass when the vehicle window glass is mounted in the vehicle.

* * * * *